United States Patent Office 2,958,092
Patented Nov. 1, 1960

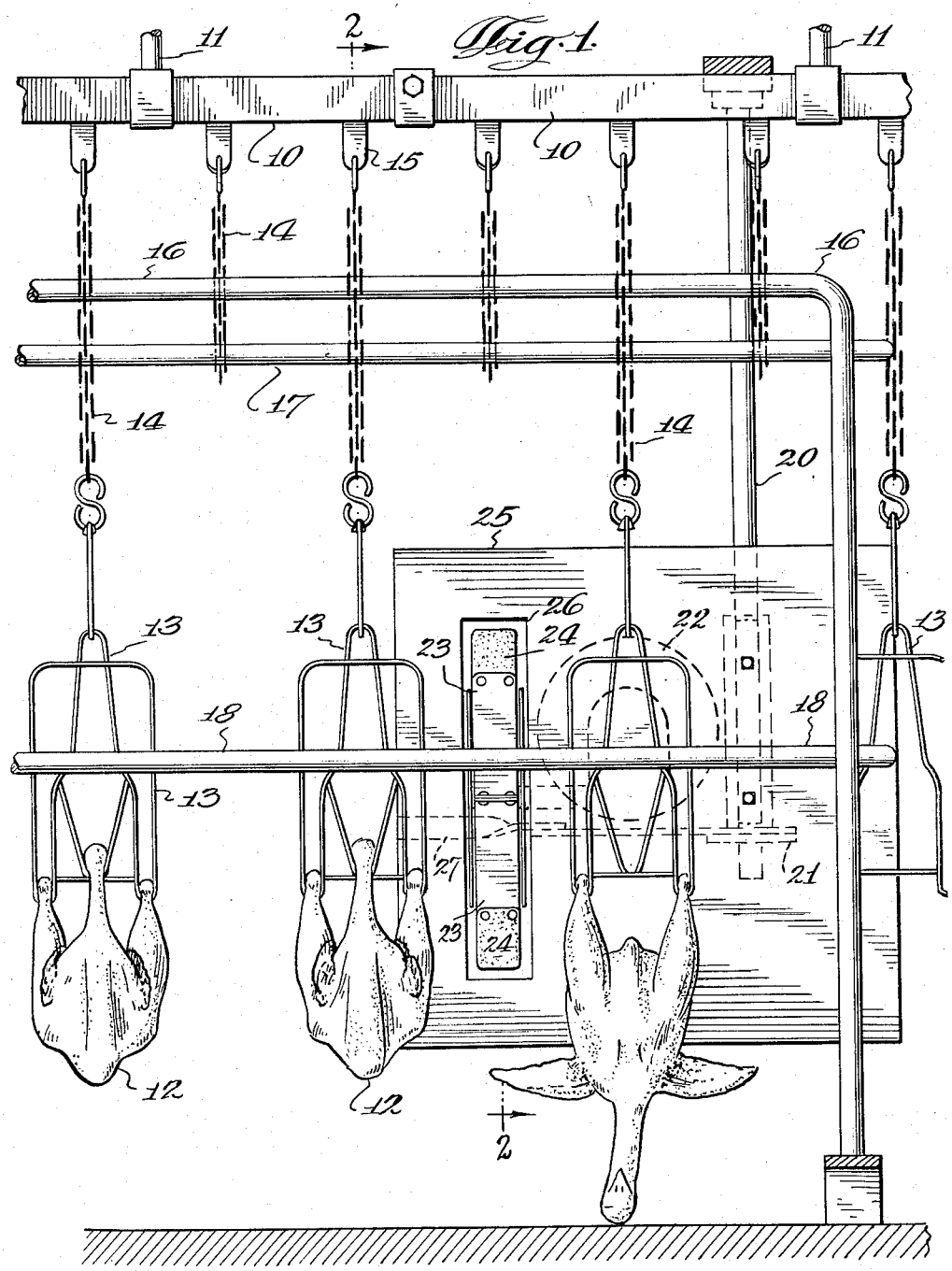

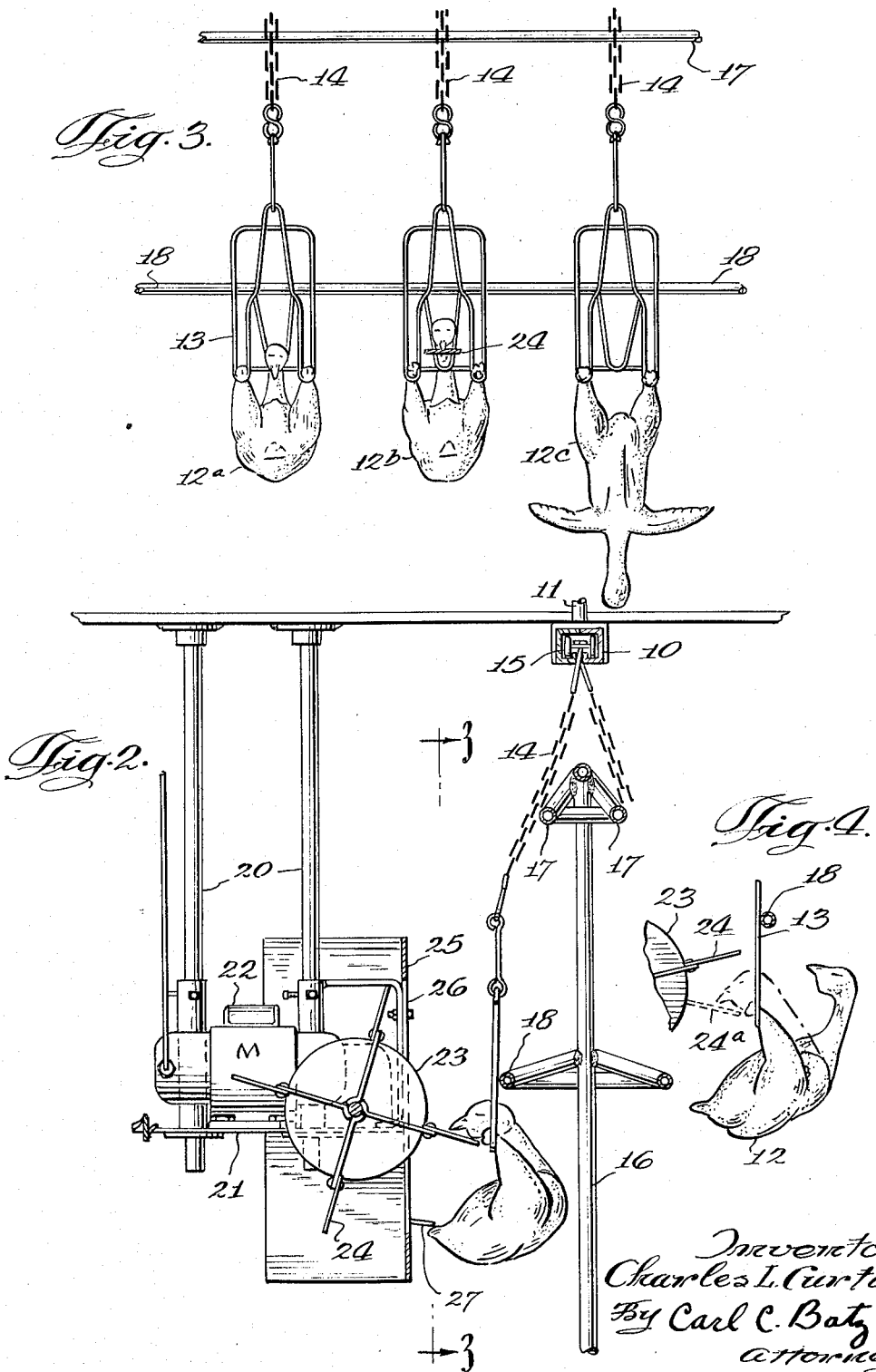

2,958,092

AUTOMATIC HEAD DROPPER FOR POULTRY

Charles L. Curtis, 109 Flower St., Turlock, Calif.

Filed May 12, 1958, Ser. No. 734,579

3 Claims. (Cl. 17—11)

This invention relates to an apparatus for the dropping of the heads of poultry which are suspended from shackles by their legs and head.

Some commercial poultry processing operations are divided into two distinct and separate operations, namely, a killing and defeathering operation and an eviscerating operation. In the first operation birds are killed, passed through a defeathering machine or machines, the feet removed in some cases and the external portions of the bird are cleaned. After these killing and picking operations are completed, the bird is transferred to an eviscerating line and/or from picking shackles to eviscerating shackles wherein the birds are suspended from three points, the two legs and the neck near the head. In some cases the bird is shackled about a horizontally disposed guide bar which extends along the eviscerating line and serves to limit the movement of the bird during the evisceration operations.

The apparatus of this invention is used in the evisceration line at a point beyond the positions wherein the three point suspension is used; at this point it is necessary to remove the heads of the birds from the shackles and cause each bird to be suspended only by the legs. In prior art practices it has been necessary to provide an operator at this point to manually "drop" i.e. remove poultry heads from the shackles and thereby to properly position the bird for further operations.

It is an object of the present invention to provide an apparatus which will automatically remove poultry heads from shackles. It is also an object to provide an automatic head dropper which can conveniently and economically be installed in existing poultry processing lines. Further objects and advantages of the invention will be apparent from the following description of the invention.

A preferred embodiment of the invention is illustrated in the accompanying drawings in which:

Fig. 1 is a side view of a poultry processing line with the automatic head dropping apparatus of this invention installed therein.

Fig. 2 is a perspective view on a reduced scale taken on line 2—2 of Fig. 1, showing the general relationship of the processing line, the machine framework, the motor rotor and shackled birds and various positioning members.

Fig. 3 is a fragmentary view taken on line 3—3 of Fig. 2 illustrating the sequence of operations in automatically removing the heads of birds from the shackles.

Fig. 4 is a fragmentary side view illustrating the movement of the head from the shackles by the paddles of the rotor.

The apparatus of this invention may be installed in a conventional poultry processing line as illustrated in Figs. 1 and 2. In such a poultry processing line there is an overhead track along which the fowl 12 are conveyed. The track 10 may be supported by any suitable means of support such as the supporting means 11. Each fowl 12 is mounted prior to the head dropping operation by three points, the legs and head, from a shackle 13 which is supported by a chain 14 or other suitable shackle supporting means which in turn is attached to a trolley 15 which is moveable along track 10. After the heads are automatically dropped, the birds are conveyed along the same track 10 in the shackles but are suspended only by the legs.

In order to increase the number of birds processed on one processing line, the various operations are performed on both sides of the line and therefore alternate birds are shackled in position to be processed on each side of the line; this arrangement is best shown in Fig. 1 wherein it is apparent that only every other shackle 13 is shown supporting a bird or fowl 12 along one side of the line. In all the drawings only those birds processed on one side of the conveyor track (and therefore by one automatic head dropper) are shown.

In order to maintain the separation of alternate birds to the proper side of the conveying line and to maintain said birds in approximately the proper position for subsequent operations, there is provided a chain divider assembly having a supporting framework 16 and side members 17 upon which the shackle support chains 14 are guided (see Fig. 1). There is also provided a means for positioning fowl and shackles in proper position for the removal of heads from the shackles, such means in the illustrated embodiment of the invention being the guide bar 18.

A machine framework 20 (see Fig. 2) is positioned adjacent to the processing line and is adapted to support the moving parts of the automatic head dropping apparatus which are mounted upon an adjustable platform 21 of the machine framework 20. A motor 22, mounted upon the adjustable platform 21, is operably connected to a rotor 23 which revolves in a plane perpendicular to the direction of movement of the birds along the processing line. Attached radially to the rotor are the means for engaging the heads of the shackled poultry, such as the radial fingers or paddles 24. These members force poultry heads from the poultry shackles when the heads are placed in the proper relationship to the revolving rotor and its attached paddles 24. A guard member 25 is mounted upon the machine framework 20 and is provided with an aperture 26. A portion of the arc described by the paddles 24 upon rotation protrudes through the aperture 26 of the guard member 25. The guard member 25 is provided with a poultry position means 27 which cooperates with the guide bar 18 in positioning poultry by means of their shackles in proper relationship to the paddles 24.

In the operation of the automatic head dropper as illustrated in Fig. 3, poultry suspended from the processing line in shackles in a 3 point suspension as in fowl 12a, are conveyed along the guide bar 18 to a position opposite the aperture 26 of the guard plate 25. The guide member 27 cooperates with the guide bar 18 in positioning the poultry in such a position that, as they pass the aperture 26, the head of the bird passes through the arc described by the paddles as they are caused to revolve by the rotor. The paddles revolve in such a direction that a paddle contacts the head on the lower portion thereof and moves it upward and out of the shackle as illustrated in the central portion of Fig. 3 in connection with fowl 12b. The head of the bird as it is propelled upwards by means of the paddle describes an arc itself which carries it free of the guide 13. This relationship is perhaps best illustrated by Fig. 4 wherein the head of the bird in its position as conveyed to the automatic head dropper is shown by the dotted line. The position of the paddle 24 immediately prior to contact with the head is also shown in the dotted line 24a. Immediately after the contact of the paddle 24 and the head of the bird, the head flies upward to the position illustrated in Fig. 4 by the solid line and thence falls freely downward (as is fowl 12c of Fig. 3). Since the paddle contacts only the head, the bird remains suspended by the legs and is thereafter in proper position for further processing operations.

It is obvious that many modifications and variations of the invention may be made without departing from the spirit and scope thereof and therefore such modifications and variations are within the scope of the independent claims.

I claim:

1. An automatic head dropper for automatically removing the heads of poultry from shackles in poultry processing operations wherein shackled poultry are conveyed in shackles engaging said poultry at the legs and neck at the head comprising a machine framework; a rotary member mounted upon said machine framework; power means connected to said rotary member for causing the rotation of said member; a paddle member mounted on said rotary member and extending outward therefrom; and guide means positioned proximate to said shackle for bringing the heads of shackled poultry into the arc described by said paddle member upon the rotation thereof.

2. In a system for continuously conveying shackled poultry along poultry processing lines wherein said shackled poultry is suspended in shackles engaging said poultry at the legs and neck at the head, an apapratus for automatically removing the heads of said poultry from said shackles comprising a machine framework adjacent to said poultry processing line, a guard member having an aperture therein on said machine framework, said guard member being adapted to position poultry adjacent to said aperture; a guide bar adjacent to said shackle and adapted to position shackled poultry adjacent to said guard member so that the beaks of the shackled poultry protrude from the shackle towards said aperture and said guard member, a rotary member, paddles on said rotary member, said rotary member being mounted on said framework so that a portion of the arc described by said paddles upon the rotation of said rotary member extends through the aperture of said guard member and into contact with the beak of said poultry, and means connected to said rotary member for rotating said member thereby causing the paddles of said rotary member to strike the beak of said poultry from the lower side thus throwing the beak upward and out of said shackle.

3. A head dropper for automatically removing the heads of poultry from shackles in poultry processing operations wherein shackled poultry are conveyed in shackles engaging said poultry at the legs and neck at the head comprising a machine framework; a rotary member radially mounted upon said machine framework; a head contacting member mounted on said rotary member and movable through a circular path of travel upon rotation of said rotary member for disengaging the heads of poultry; and guide means proximate to said shackles for bringing the heads of shackled poultry into the path of travel of said member for disengaging the heads of poultry from shackles.

References Cited in the file of this patent

UNITED STATES PATENTS

| | | |
|---|---|---|
| 1,760,392 | Arminger | May 27, 1930 |
| 2,810,926 | Mitchell et al. | Oct. 29, 1957 |
| 2,846,717 | Patterson et al. | Aug. 12, 1958 |